United States Patent Office 2,933,487
Patented Apr. 19, 1960

2,933,487

METHOD OF PRODUCING L-GLUTAMYL PEPTIDES

Gaston Amiard, Noisy-le-Sec, René Heymes, Romainville, and Leon Velluz, Paris, France, assignors to UCLAF, Paris, France, a body corporate No Drawing. Application July 6, 1956
Serial No. 596,151

Claims priority, application France July 29, 1955

14 Claims. (Cl. 260—112)

This invention relates to a method of producing glutamyl peptides from glutamic acid (I).

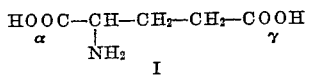

More particularly, the invention relates to a method of producing either α or γ glutamyl peptides, depending upon which of the two carboxyl groups of glutamic acid is reacted with the $NH_2$ of an amino acid or peptide, while $H_2O$ is eliminated.

Various natural polypeptides comprise as part of the peptide chain constituting these compounds one or several glutamyl peptide groups, and the herein claimed process permits the preparation of L-glutamyl peptides VI or VII (see chart, columns 9 and 10, of this specification). These compounds can then be introduced into other peptide molecules in order to synthesize more complex compounds, such as higher polypeptide chains. Moreover, these glutamyl peptides as such are of great interest in biology and practical nutrition.

In the co-pending application Serial No. 527,634 of August 10, 1955, of which this application is a continuation-in-part, the preparation of N-trityl amino acids has been described. According to said disclosure, the method consists in reacting esters of the corresponding amino acids with trityl chloride in the presence of a tertiary base. If the ester is used in form of the hydrochloride compound, an excess of a base is applied which is capable of breaking the acid bond at once and neutralizing the hydrochloric acid liberated by the reaction. The saponification of the N-tritylated amino ester formed in this manner leads to the desired N-trityl amino acid.

Moreover, in the same co-pending application a method has been described of obtaining N-peptides by converting such N-trityl amino acids into mixed anhydrides and reacting the latter with an amino ester. The saponification of the resulting N-trityl peptide ester, followed by detritylation upon heating with aqueous acetic acid, produces the desired peptides without racemization taking place. Certain N-tritylated amino acids, however, do not lend themselves to the conversion into peptides by the foregoing method using mixed anhydrides, but, according to the co-pending U.S. patent application Ser. No. 594,106 of June 27, 1956, entitled Process of Producing Peptides and Products Obtained Thereby, they can be easily converted into the corresponding N-trityl peptides by reacting with an amino acid ester in the presence of dicyclohexylcarbodiimide. Saponification and detritylation with aqueous acetic acid produce the desired N-peptide.

According to the present invention, γ or α-glutamyl peptides are obtained by taking advantage of certain properties of various N-tritylated L-glutamic acid diesters (III), monoesters (IV), or mixed diesters (IX); (R' different from R).

It has now been found that in glutamic acid diesters (III) the ester group in the α-position is very resistant against alkalies, so that the monosaponification of these diesters in the γ-position is readily accomplished. In this manner, N-tritylated α-monoester (IV) is obtained. As has been disclosed in the co-pending U.S. patent application Ser. No. 594,117 of June 27, 1956, now U.S. Pat. No. 2,883,399, entitled Method of Preparing L(+)-Glutamine, advantage can be taken of this stability for preparing γ-methyl α-methyl N-trityl glutamate (IX); (R'=$CH_2$—$C_6H_5$, R=$CH_3$), in subjecting dibenzyl N-trityl glutamate (III); (R=R'=—$CH_2$—$C_6H_5$), to a methanolysis in the presence of an alkaline agent.

In order to arrive at α-glutamyl peptides, it is sufficient to subject α-benzyl- γ-methyl N-trityl glutamate (IX); (R'=$CH_2$—$C_6H_5$, R=$CH_3$), to a hydrogenolysis. This produces γ-monomethyl N-trityl glutamate (X); (R=$CH_3$), which, upon condensation with an amino ester in the presence of dicyclohexylcarbodiimide, yields the diester of the corresponding N-tritylated α-glutamyl peptide (XI). Alkaline saponification and detritylation by means of aqueous acetic acid produces α-glutamyl peptide (VII).

Consequently, it could have been assumed that γ-glutamyl peptides should be obtainable in the same simple manner by starting from the aforementioned α-monoester (IV). Yet, the application of this method, using dicyclohexylcarbodiimide, does not lead to γ-peptides s might be expected. Instead, the diester of N-trityl L-γ-glutamyl peptide (V) is formed. The ester radical in the α-position of this compound is very unstable, while it is very stable in the starting compound, N-tritylated glutamic diester. Thus, it seems very likely that, in the presence of alkalies, compound V forms the intermediate compound (VIII), which upon alkaline hydrolysis, followed by detritylation, substantially yields α-glutamyl peptide (VII), in addition to a very small percentage of γ-glutamyl peptide (VI). Therefore, this method constitutes a new way of preparing α-glutamyl peptides (VII), which, according to the invention, may be prepared by either starting from a γ-monomethyl N-trityl glutamate (X); (R=$CH_3$), or by starting from an α-alkyl N-trityl glutamate (IV), and condensing in the presence of dicyclohexylcarbodiimide with an amino ester followed by alkaline saponification and detritylation.

Inasmuch as saponification causes molecular rearrangement, it was necessary to avoid saponification in order to arrive at γ-glutamyl pepetides (VI). This is achieved according to the herein claimed process by using as starting product α-benzyl N-trityl glutamate (IV); (R'=—$CH_2$—$C_6H_5$). This compound is obtained, similarly as γ-methyl N-trityl glutamate, by starting from compound IX; (R'=$CH_2$—$C_6H_5$, R=$CH_3$), but subjecting the latter to monosaponification instead of hydrogenolysis.

By condensing compound IV with the benzyl ester of an amino acid in the presence of dicyclohexylcarbodiimide, the benzyl diester of N-trityl γ-glutamyl peptide (V); (R'=R"=$CH_2$—$C_6H_5$) is obtained, from which it is possible to liberate the two carboxyl groups by hydrogenolysis without molecular rearrangement. After detritylation with aqueous acetic acid, γ-glutamyl peptide (VI) is obtained.

If, however, after obtaining the diester (V), the hydrogenolysis step is replaced by an alkaline saponification, followed by detritylation, the corresponding α-glutamyl peptide (VII) is obtained, which is proof of the molecular rearrangement taking place during saponification.

It is to be noted that both methods, leading, according to this invention, either to α-glutamyl peptides or to γ-glutamyl peptides, produce excellent yields and do not cause racemization. Therefore, it is now possible to prepare α and γ-peptides of DL-glutamic acid by the same methods, and it is obvious that the process can equally well be used in connection with D-glutamic acid.

It is, therefore, one object of the present invention to provide new and advantageous methods of preparing α- and γ-glutamyl peptides.

It is another object of the invention to provide new tritylated α- and γ-glutamyl peptide derivatives and diesters of these derivatives with lower aliphatic alcohols.

It is an ultimate object of this invention to prepare glutamyl peptides and higher peptides comprising glutamyl peptides in the polypeptide chain.

These and other objects and advantages of the invention will appear more fully from the herein following detailed description and the appended claims.

The chart on columns 9 and 10 illustrates the sequence of the various reaction steps resulting in the diverse compounds as set forth in the herein following examples. The melting points indicated in the examples are instantaneous melting points determined by means of the heated block method.

EXAMPLE 1

*Preparation of α-monoethyl N-trityl L-glutamate (IV); (R'=$C_2H_5$)*

2.8 g. of trityl chloride are added to a solution of 2.4 g. of diethyl L-glutamate hydrochloride in 25 cc. of chloroform and 3 cc. of triethylamine, which has been cooled to 0° C. After standing for one hour at room temperature, the solution is washed with water and dried over magnesium sulfate. The solvent is driven off and the oily, crude product taken up with 40 cc. of alcohol. The alcoholic solution is neutralized by means of several drops of normal sodium hydroxide and is refluxed while 10 cc. of normal sodium hydroxide are added in fractions within a period of about 20 minutes, using phenophthalein as an indicator of the neutralization.

At the end of the reaction the solution remains slightly alkaline. It is cooled and acidified with acetic acid; the precipitate formed thereby is separated and washed with water. After drying, 3.3 g. of α-monoethyl N-trityl L-glutamate are obtained, equivalent to a yield of 80%. The gummy product does not crystallize. However, it yields, with D(—)threo 1-p-nitrophenyl 2-amino propane 1,3-diol, in 50%-alcohol, a well crystallized salt in form of hydrated flakes (comprising about one molecule of water of crystallization), melting point=100° (decomposition), $[\alpha]_D^{20}$=+34.5° ±1 (c=2%, methanol). This new product is yellowish, soluble in alcohol and acetone, difficultly soluble in ether, very difficultly soluble in water, insoluble in benzene. It is decomposed by diluted acids and alkalies.

*Analysis.*—$C_{35}H_{39}O_8N_3$=629.7. Calculated: 66.8% C; 6.2% H; 6.7% N; 20.3% O. Found: 66.8% C; 6.2% H; 6.7% N; 20.5% O.

EXAMPLE 2

*Preparation of α-monomethyl N-trityl L-glutamate (IV); (R'=$CH_3$)*

This compound is obtained by using dimethyl L-glutamate hydrochloride as starting material and following the N-tritylation and saponification procedure of Example 1. The crude product may be crystallized in cyclohexane. The yield of the pure product, melting point=140–141° C., $$[\alpha]_D^{20}=+45°+1$$

(c=2%, methanol) is 50%. The compound appears in form of colorless needles which are soluble in acetone, chloroform, ether and diluted alkalies, difficultly soluble in alcohol, insoluble in water and diluted acids.

*Analysis.* — $C_{25}H_{25}O_4N$=403.5. Calculated: 74.4% C; 6.25% H; 3.5% N; 15.9% O. Found: 74.6% C; 6.2% H; 3.5% N; 16.3% O.

This new compound forms with D(—)threo 1-p-nitrophenyl 2-amino propane 1,3-diol a hydrated salt, melting point=100° C. (decomposition, $[\alpha]_D^{20}$=+32.5°±1 (c=2%, methanol), which is also new.

EXAMPLE 3

*Preparation of α-benzyl N-trityl L-glutamate (IV); (R'=$CH_2$—$C_6H_5$)*

This compound is prepared by starting from α-benzyl γ-methyl N-trityl L-glutamate, as described in Example 2 of the aforementioned co-pending U.S. patent application Serial No. 594,117 of June 27, 1956, now U.S. Pat. No. 2,883,399 entitled Method of Preparing L(+)-Glutamine.

About 21 cc. of normal sodium hydroxide are gradually added, within a period of fifteen to twenty minutes, to a solution of 9.87 g. of this diester in 100 cc. of methanol while refluxing. After continuing the boiling for another fifteen minutes, the solution is concentrated to one-half of the original volume, diluted with 40 cc. of water, filtered through charcoal and acidified with hydrochloric acid to a pH of 2 to 3. The compound precipitates in a pulverulent state. It is separated, washed with water and dried in the desiccator. This α-benzyl N-trityl L-glutamate is used directly for the synthesis of γ-glutamyl peptides.

EXAMPLE 4

*Preparation of α-L-glutamyl glycine (VII); ($R_1$=H), from α-monoethyl N-trityl L-glutamate (IV); (R'=$C_2H_5$)*

(a) *Condensation of α-monoethyl N-trityl L-glutamate with ethyl glycinate.* 1.1 g. of free ethyl glycinate are prepared from ethyl glycinate hydrochloride, as described in the co-pending U.S. application Ser. No. 594,106, filed June 27, 1956, entitled Process of Producing Peptides and Products Obtained Thereby.

This ethyl glycinate is dissolved in 3 cc. of methylene chloride, and a solution of 2.5 g. of dicyclohexylcarbodiimide in 5 cc. of methylene chloride is added. The solution is cooled to 0° C., and 4.17 g. of α-monoethyl N-trityl glutamate, described in Example 1, are added. The solution is left standing overnight at room temperature. The excess of dicyclohexylcarbodiimide is then decomposed by adding 0.5 cc. of acetic acid and the solution is left undisturbed for thirty minutes. After separating dicyclohexylurea that has formed, the solution is washed with 3 cc. normal hydrochloric acid, then with water, diluted ammonia and again with water, whereupon it is dried over magnesium sulfate, filtered and evaporated to dryness. This produces the crude diethyl diester (V); (R' and R"=$C_2H_5$), which is used without purification.

(b) *Saponification of crude diethyl diester of N-trityl γ-glutamyl glycine (V); (R' and R"=$C_2H_5$), with simultaneous rearrangement and detritylation.* The crude diester obtained according to (a) is saponified by refluxing for 5 minutes with 10 cc. of a 20% potassium solution in methanol and 2 cc. of water. After diluting with 50 cc. of water and removing a slight precipitate, the solution is acidified with acetic acid, extracted with chloroform and washed with water. The chloroform solution is dried over magnesium sulfate and evaporated to dryness. As a result of the molecular rearrangement caused by the saponification, the resulting product consists substantially of N-trityl α-glutamyl glycine. The crude product is heated for five minutes in a water bath with 20 cc. of 50% acetic acid. Triphenyl carbinol which is set free thereby crystallizes. The mixture is cooled, 10 cc. of water are added, and the triphenyl carbinol is separated. After concentrating the filtrate to a small volume and adding absolute alcohol, crystallization takes place, which is enhanced by cooling. The crystalline precipitate is washed with alcohol and dried, and produces 1.5 g. (or a yield of 75%) of α-glutamyl glycine (VII); ($R_1$=H). Recrystallization in 50%-alcohol yields, after drying, 1.1 g. of α-glutamyl glycine, free from γ-glutamyl glycine (the product does not give any ninhydrine reaction), melting point=220° C. (decomposition), $[\alpha]_D^{20}$=79.5°

±1 ($c=2\%$, water). The product is soluble in water, in aqueous diluted acids and alkalies, insoluble in alcohol and ether. The specific rotatory power is +80°, the same as stated in the literature.

Analysis.—$C_7H_{12}O_5N_2=204.2$. Calculated: 41.2% C; 5.9% H, 13.7% N. 39.2% O. Found: 41.0% C; 6.1% H; 13.6% N; 39.4% O.

The identical product is obtained by starting from other glutamic N-trityl acid monoesters, such as the α-methyl ester, and following the same operating procedure. The ester radicals of the glycine may be different from those of the glutamic acid. Thus, starting from α-methyl N-trityl glutamate and ethyl glycinate, the mixed diester (V); (R'=$C_2H_5$, R''=$C_2H_5$), is obtained which furnishes α-glutamyl glycine.

EXAMPLE 5

Preparation of α-glutamyl glycine (VII); ($R_1$=H) from γ-methyl N-trityl L-glutamate (X); (R=$CH_3$)

(a) *Condensation of γ-methyl N-trityl L-glutamate with ethyl glycinate.* This condensation is performed according to Example 4(a).

(b) *Saponification of the diester of N-trityl α-glutamyl glycine (XI); (R=$CH_3$, $R_1$=H, R''=$C_2H_5$), and detritylation.* The method of Example 4(b) is followed which produces, without molecular rearrangement, α-L-glutamyl glycine at a yield of 55%.

EXAMPLE 6

Preparation of α-L-glutamyl glycine (VII); ($R_1$=H), from α-benzyl N-trityl L-glutamate (IV); (R'=$CH_2C_6H_5$)

(a) *Condensation of α-benzyl N-trityl L-glutamate with benzyl glycinate.* 3.6 g. of free benzyl glycinate are prepared by treating a solution of benzyl glycinate hydrochloride with the theoretical amount of 5 N potassium hydroxide, salting out, extracting with ether and evaporating to dryness. The benzyl glycinate thus obtained is dissolved in 6 cc. of methylene chloride. A solution of 5 g. of dicyclohexylcarbodiimide in 10 cc. of methylene chloride is added, the mixture is cooled to 0° C. and 9.6 g. of crude α-benzyl N-trityl L-glutamate, obtained according to Example 3, are added. After treating the solution as described in Example 4, the theoretical yield of the crude dibenzyl diester (V);

(R' and R''=—$CH_2$—$C_6H_5$, $R_1$=H)

is obtained.

(b) *Saponification of the crude dibenzyl diester of N-trityl γ-glutamyl glycine (V);*

(R' and R''=—$CH_2$—$C_6H_5$, $R_1$=H)

*with rearrangement and detritylation.* The product obtained according to (a) is saponified by boiling for ten minutes with a potassium solution in methanol, as described in the preceding example. After a portion of the methanol has been distilled off and after dilution with water, the solution is acidified with acetic acid and extracted with chloroform. The product, obtained after removal of the chloroform and consisting of a mixture of N-trityl L-α-glutamyl glycine and N-trityl L-γ-glutamyl glycine, is detritylated by heating with a 50% aqueous acetic acid. After separating triphenyl carbinol and adding alcohol, concentration and crystallization are carried out, as previously described. Upon recrystallization in aqueous alcohol, a yield of 50% of pure α-glutamyl glycine is obtained identical with the product obtained according to Example 4.

EXAMPLE 7

Preparation of γ-glutamyl glycine (VI); ($R_1$=H), from α-benzyl N-trityl L-glutamate (IV); (R'=$CH_2$—$C_6H_5$)

(a) *Condensation of α-benzyl N-trityl L-glutamate with benzyl glycinate.* The procedure is the same as in Example 6(a).

(b) *Hydrogenolysis of the crude dibenzyl diester of N-trityl γ-glutamyl glycine (V); (R' and R''=—$CH_2$—$C_6H_5$, $R_1$=H), and detritylation.* The crude product obtained according to (a) is hydrogenolyzed in an alcohol solution. After dissolving in 55 cc. of alcohol, 5 cc. are distilled off in order to eliminate methylene chloride. The solution is diluted to 300 cc. with additional alcohol, and is then treated with hydrogen, after adding 6 g. of palladium black obtained from 30 cc. of palladous chloride. 760 cc. of hydrogen are readily fixed (theoretical requirement: 880 cc.). After filtration and washing the palladium black with alcohol, the solution is vacuum evaporated to dryness. The residue is detritylated by adding 20 cc. of 50% aqueous acetic acid and heating in a water bath. Then, 20 cc. of water are added, the mixture is permitted to cool and precipitated triphenyl carbinol is removed by filtration. The filtrate is concentrated to a small volume, taken up with water, again concentrated in order to expel acetic acid and taken up with alcohol. γ-Glutamyl glycine (VI); ($R_1$=H), precipitates which is separated, washed with acetone and dried. The yield is 1.4 g. or 70% of the theory. The product is purified by dissolving in water and reprecipitating with alcohol or acetone. The pure, crystalline product is obtained at a yield of about 60%, $[\alpha]_D^{20}=+11.5°\pm1$ ($c=2\%$, water). It has a strongly positive reaction to ninhydrine. γ-Glutamyl glycine takes the form of prisms which are soluble in water, in aqueous diluted acids and alkalies, insoluble in alcohol, ether, acetone and benzene.

EXAMPLE 8

Preparation of L-α-glutamyl L-leucine (VII);

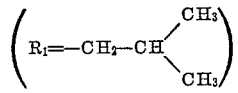

from γ-monomethyl N-trityl L-glutamate (X); (R=$CH_3$)

(a) *Condensation of γ-methyl N-trityl glutamate with methyl L-leucinate.* 3.2 g. of free methyl leucinate are prepared from the hydrochloride thereof according to the method used for preparing ethyl glycinate described in Example 4(a). The product is dissolved in 20 cc. of methylene chloride, 5 g. of dicyclohexylcarbodiimide are added, and the solution is cooled to 0° C. 8.1 g. of γ-methyl trityl glutamate, the preparation of which has been described in the U.S. Patent No. 2,883,399, entitled Method of Preparing L(+)-Glutamine, are added, while agitating to aid dissolution. The mixture is left standing in the icebox for 65 hours. 1 cc. of acetic acid is then added, the solution is left undisturbed for thirty minutes, and precipitated dicyclohexylurea is separated and washed with methylene chloride which is added to the filtrate. This filtrate is washed with diluted hydrochloric acid, diluted ammonia and finally with water, and is then filtered and vacuum evaporated to dryness. The oily residue is taken up with 25 cc. of methanol, 4 cc. of water are added, and crystallization is permitted to take place while cooling. The precipitate is separated, washed with aqueous methanol and dried. The product, which can be used directly, weighs 6.8 g. The mother liquor yields upon standing another 0.6 g. of the same product (XI);

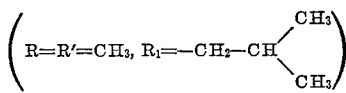

giving a yield of 70%. For purposes of analysis, the compound is recrystallized in aqueous methanol. Melting point=121–122° C., $[\alpha]_D^{20}=+10°\pm1$ ($c=2\%$, methanol). This methyl diester of L-N-trityl α-glutamyl L-leucine appears in form of needles which are soluble in alcohol and ether, aqueous alcohols, insoluble in water and aqueous diluted alkalies. This new compound is decomposed by aqueous diluted acids.

*Analysis.*—$C_{32}H_{38}O_5N_2=530.6$. Calculated: 72.43% C; 7.23% H; 15.08% O; 5.28% N. Found: 72.5% C; 7.1% H; 15.0% O; 5.4% N.

(b) *Saponification of the methyl diester of L-N-trityl α-glutamyl L-leucine and detritylation.* 6.3 g. of the crude diester prepared according to (a) are taken up with 20 cc. of methanol. 10 cc. of a 20% potassium hydroxide solution in methanol and 5 cc. of water are added. The mixture is refluxed for two minutes, 25 cc. of water are added to the boiling liquid, and the methanol is driven off under partial vacuum. After cooling, the solution is acidified to pH 2 by adding about 35 cc. of normal hydrochloric acid, and the trityl peptide is extracted with chloroform. The chloroform solution is dried over magnesium sulfate, filtered and vacuum evaporated to dryness. The residue is taken up with 20 cc. of 50% aqueous acetic acid. The solution is boiled for one minute, 20 cc. of water are added, and triphenyl carbinol is filtered off while hot. Upon washing with boiling water, the combined acetic solutions are concentrated to a small volume, whereby the peptide crystallizes. After adding absolute alcohol and cooling, the crystalline precipitate is separated and dried, producing 2.2 g. of L-α-glutamyl L-leucine, corresponding to a yield of 71%. The product appears in form of colorless flakes, melting point=250° C. It melts at about 195° C. in the capillary tube, $[\alpha]_D^{25}=+10°\pm1$ ($c=2\%$, water plus a trace of hydrochloric acid). It is soluble in diluted aqueous acids and alkalies, difficultly soluble in water, insoluble in alcohol, ether, benzene and acetone. It does not give the ninhydrine reaction. The same compound has been obtained by another method by Le Quesne and Young (J. Chem. Soc., 1950, p. 1954).

EXAMPLE 9

*Preparation of L-γ-glutamyl L-leucine (VI)*

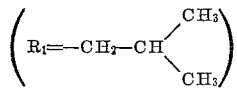

*from α-monobenzyl N-trityl L-glutamate (IV)*

$(R'=-CH_2-C_6H_5)$ (a) *Condensation of α-monobenzyl N-trityl glutamate with benzyl L-leucinate.* This compound is prepared according to Example 6(a), starting from 4.5 g. of benzyl leucinate prepared according to the method of Cipera and Nicholls (Chemistry and Industry, 1955, 1, 16), 5 g. of dicyclohexylcarbodiimide, and 9.6 g. of α-monobenzyl N-trityl glutamate prepared according to Example 3. The procedure results in 15.2 g. of the benzyl diester of crude N-trityl γ-glutamyl peptide (V);

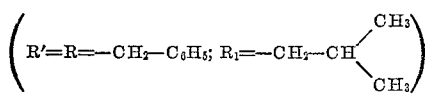

(b) *Hydrogenolysis of the benzyl diester of N-trityl L-γ-glutamyl L-leucine and detritylation.* The condensation product obtained in the preceding example is taken up with 200 cc. of absolute alcohol and is hydrogenated in the presence of 1.5 g. of palladium-treated charcoal, having 6.5% palladium. After 5 minutes, another 4.5 g. of palladium-treated charcoal are added, and the hydrogenation is continued for thirty minutes. The semicrystallized product obtained after filtration, concentration to small volume and separation, is taken up with 20 cc. of hot 50% aqueous acetic acid and is kept hot for 10 minutes. 20 cc. of water are added and triphenyl carbinol is separated. The resulting solution is concentrated to syrupy consistency, and 300 cc. of acetone are added to the concentrate. Desiccation and drying at 80° C. produces 2.6 g. of L-γ-glutamyl L-leucine, or a yield of 50% on the basis of the initial α-monobenzyl N-trityl glutamate. The product melts at 185° C. (slow melting) and at 220° C. (instantaneous melting) with decomposition, $[\alpha]_D^{20}=-14°\pm1$ ($c=2\%$, water). These constants correspond well with constants given in the literature (cf. Rowland and Young, J. Chem. Soc., 1952, 3937).

EXAMPLE 10

*Preparation of L-α-glutamyl L-tyrosine (VII)*

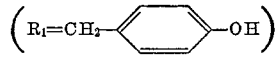

*from γ-methyl N-trityl L-glutamate (X); (R=CH₃)*

(a) *Condensation of γ-methyl N-trityl L-glutamate with ethyl tyrosinate.* Free ethyl tyrosinate is prepared by treating the hydrochloride thereof with an excess of 5 N ammonia. The product crystallizes. It is separated, washed with water and dried in a sulfuric acid desiccator. By proceeding according to Example 4(a) and starting from 4.3 g. of ethyl tyrosinate, 20 cc. of methylene chloride and 8.1 g. of γ-monomethyl L-N-trityl glutamate, 14 g. of the crude condensation product (XI);

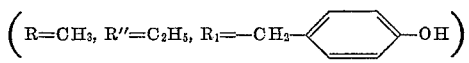

are obtained.

(b) *Saponification of the mixed diester (XI) of N-trityl α-glutamyl L-tyrosine and detritylation.* Saponification is carried out as in Example 4(b) and in the presence of 20 cc. of ether. By means of hydrochloric acid, the saponified product is acidified until it has a pH of 2. The compound changes into a crystalline mass, which gradually disintegrates. After pasting with ether and drying, 7.8 g. of N-trityl α-glutamyl peptide are obtained which can be directly detritylated. For purposes of analysis, the compound is recrystallized in aqueous methanol. It assumes the form of needles.

$[\alpha]_D^{25}=+19°\pm2$ ($c=1\%$, 75% methanol+1 NaOH)

This new compound is soluble in ether, chloroform and alcohol, difficultly soluble in aqueous diluted alkalies, insoluble in water. It is decomposed by diluted acids.

*Analysis.*—$C_{33}H_{32}O_6N_2=552.6$. Calculated: 71.72% C; 5.84% H; 17.37% O; 5.07% N. Found: 71.72% C; 6.1% H; 17.3% O; 5.1% N.

Detritylation of the crude product with 50% acetic acid results, after the usual treatment, in L-α-glutamyl L-tyrosine, obtained at a yield of 75%. Melting point (decomposition)=235° C., $[\alpha]_D=+29°\pm1$ ($c=2\%$, water+1 HCl)

The peptide appears in form of colorless needles. It is soluble in aqueous acids and alkalies, very difficultly soluble in water, insoluble in alcohol, acetone, benzene. It is identical with the product described by Bergmann et al. (Ztschr. f. physiol. Chem., 1934, 224, 17).

EXAMPLE 11

*Preparation of γ-glytamyl L-tyrosine (VI)*

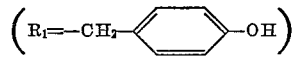

*from α-benzyl N-trityl glutamate (IV)*

$(R'=-CH_2-C_6H_5)$ (a) *Condensation of α-benzyl N-trityl glutamate with benzyl L-tyrosinate.* The procedure of Example 6(a) is followed, after preparing benzyl tyrosinate according to the method of Cipera and Nicholls (Chemistry and Industry, 1955, p. 16). The resulting product is used in its crude state. For purposes of analysis, it is purified by recrystallization in ethyl acetate, melting point=120° C., $[\alpha]_D^{25}=-12.5°\pm1$ ($c=2\%$, methanol). Starting from 5.6 g. of benzyl tyrosinate, 20 cc. of methylene chloride, 5 g. of dicyclohexylcarbodiimide and 9.6 g. of α-benzyl N-trityl glutamate, and carrying out the usual treatment, 16 g. of the crude benzyl diester of N-trityl γ-glutamyl peptide (V);

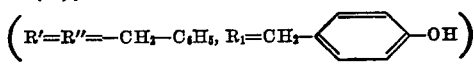

are obtained.

(b) *Hydrogenolysis of the benzyl diester of N-trityl L-γ-glutamyl L-tyrosine and detritylation.* Proceeding according to Example 9(b), after the acetic solution of the desired peptide has been concentrated to small volume, acetone is added. A pulverulent precipitate is obtained, which is separated, dried, and dissolved in 10 cc. of water. This solution is filtered, treated with acetone, and the resulting precipitate is washed with acetone and dried. This produces 4 g. of γ-glutamyl L-tyrosine, corresponding to a yield of 65%. The amorphous product crystallizes slowly by dissolving in a minimum amount of water and adding acetone until the solution begins to become turbid. Melting point (decomposition)=about 255° C., $[\alpha]_D^{25} = +26° \pm 1$ (c=2%, water).

The compound is identical to that obtained by another method by Le Quesne and Young (J. Chem. Soc., 1950, p. 1959).

It will be obvious from the foregoing, that the N-tritylated glutamic acid esters obtained according to this invention may be reacted with other amino acids than the exemplified amino acids, that different solvents may be used, or the reaction temperature be varied and other means of carrying out the condensation be applied without exceeding the scope of this invention.

We claim:

1. In a process of producing a glutamyl peptide, the steps which comprise adding a solution of an N-tritylated glutamic acid monoester in methylene chloride at 0° C. to a solution, in methylene chloride, of an α-amino carboxylic acid ester of the formula $$R-CH-COOR'$$
$$|$$
$$NH_2$$

wherein:

R represents a member selected from the group consisting of hydrogen, an alkyl radical, an aryl radical, an aralkyl radical, and an aralkyl radical having a hydroxyl group in its aromatic nucleus, and R' represents a member selected from the group consisting of an alkyl radical and a benzyl radical, in the presence of dicyclohexyl carbodiimide, allowing the mixture to stand at a temperature not substantially exceeding room temperature until condensation of the N-trityl glutamic acid monoester with the α-amino carboxylic acid ester is substantially completed, adding acetic acid to said mixture to convert excess dicyclohexyl carbodiimide into dicyclohexyl urea, removing precipitated dicyclohexyl urea, recovering the resulting N-trityl peptide diester from the solution, heating said diester with an alcoholic solution of an alkali metal hydroxide until saponification of the ester groups is substantially completed, and heating the resulting N-trityl glutamyl peptide with an aqueous about 50% acetic acid solution until the trityl group is split off.

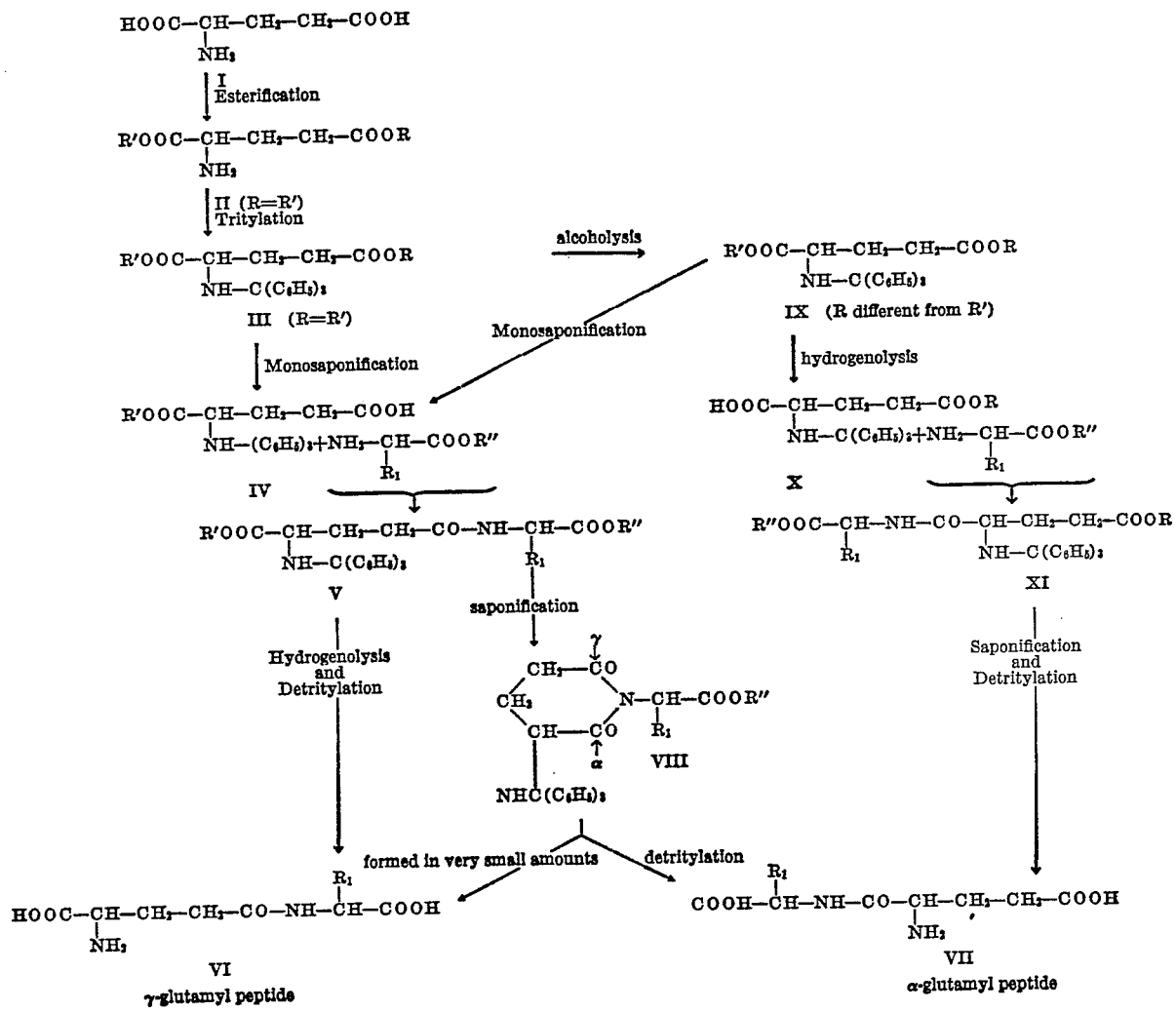

2. In a process of producing an α-glutamyl peptide, the steps which comprise adding a solution of an N-tritylated glutamic acid monoester selected from the group consisting of an N-tritylated α-glutamic acid monoester and an N-tritylated γ-glutamic acid monoester in methylene chloride at 0° C. to a solution, in methylene chloride, of an α-amino carboxylic acid ester of the formula

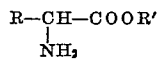

wherein:

R represents a member selected from the group consisting of hydrogen, an alkyl radical, an aryl radical, an aralkyl radical, and an aralkyl radical having a hydroxyl group in its aromatic nucleus, and R' represents a member selected from the group consisting of an alkyl radical and a benzyl radical, in the presence of dicyclohexyl carbodiimide, allowing the mixture to stand at a temperature not substantialy exceeding room temperature until condensation of the N-trityl glutamic acid monoester with the α-amino carboxylic acid ester is substantially completed, adding acetic acid to said mixture to convert excess dicyclohexyl carbodiimide into dicyclohexyl urea, removing precipitated dicyclohexyl urea, recovering the resulting N-trityl peptide diester from the solution, heating said diester with an alcoholic solution of an alkali metal hydroxide until saponification of the ester groups is substantially completed, and heating the resulting N-trityl-α-glutamyl peptide with an aqueous about 50% acetic acid solution until the trityl group is split off.

3. In a process of producing a γ-glutamyl peptide, the steps which comprise adding a solution of the α-benzyl ester of N-trityl glutamic acid in methylene chloride at 0° C. to a solution, in methylene chloride, of the benzyl ester of an α-amino carboxylic acid of the formula

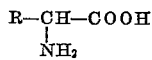

wherein:

R represents a member selected from the group consisting of hydrogen, an alkyl radical, an aryl radical, and an aralkyl radical having a hydroxyl group in its aromatic nucleus, in the presence of dicyclohexyl carbodiimide, allowing the mixture to stand at a temperature not substantially exceeding room temperature until condensation of the N-trityl glutamic acid monoester with the α-amino carboxylic acid benzyl ester is substantially completed, adding acetic acid to said mixture to convert excess dicyclohexyl carbodiimide into dicyclohexyl urea, removing precipitated dicyclohexyl urea, recovering the resulting N-trityl peptide benzyl diester from the solution, treating an alcoholic solution of said diester with hydrogen in the presence of palladium catalyst, removing the catalyst, and heating the resulting N-trityl γ-glutamyl peptide with aqueous about 50% acetic acid solution until the trityl group is split off.

4. The process according to claim 2, wherein said N-tritylated glutamic ester is α-methyl N-trityl glutamate and said amino acid ester is methyl glycinate.

5. The process according to claim 2, wherein said N-tritylated glutamic ester is α-ethyl N-trityl glutamate and said amino acid ester is ethyl L-tyrosinate.

6. The process according to claim 3, wherein said N-tritylated glutamic ester is α-benzyl glutamate and said amino acid ester is benzyl glycinate.

7. The process according to claim 2, wherein said N-tritylated glutamic ester is γ-methyl glutamate and said amino acid ester is ethyl glycinate.

8. The process according to claim 2, wherein said N-tritylated glutamic ester is γ-methyl glutamate and said amino acid ester is methyl L-leucinate.

9. The group of compounds consisting of N-tritylated α- and γ-glutamyl peptides and diesters of N-tritylated α- and γ-glutamyl peptides.

10. N-trityl α-glutamyl glycine.

11. N-trityl γ-glutamyl methyl benzyl diester.

12. N-trityl α-glutamyl leucine.

13. N-trityl γ-glutamyl leucine benzyl diester.

14. N-trityl α-glutamyl tyrosine methyl ethyl diester.

References Cited in the file of this patent

FOREIGN PATENTS 1,100,016     France                Mar. 30, 1955

OTHER REFERENCES

Benary: Ber. Deut. Chem., vol. 57, pp. 1324–27 (1924).

Helferich et al.: Ber. Deut. Chem., vol. 58, pp. 882–5 (1925).

Anson et al.: "Advances in Protein Chem.," vol. 5, p. 43 (1949).

Sheehan: J. Am. Chem. Soc., vol. 77, pp. 1067–68 (1955).